(12) United States Patent
Shantharam et al.

(10) Patent No.: US 11,420,109 B2
(45) Date of Patent: Aug. 23, 2022

(54) METHOD FOR TRACKING THE PHYSICAL ACTIVITIES OF A USER IN REAL WORLD TO INTERACT WITH A VIRTUAL ENVIRONMENT

(71) Applicant: KAHA PTE. LTD., Singapore (SG)

(72) Inventors: Sudheendra Shantharam, Bengaluru (IN); Nischal Srivastava, Bengaluru (IN)

(73) Assignee: KAHA PTE. LTD., Singapore (SG)

(*) Notice: Subject to any disclaimer, the term of this patent is extended or adjusted under 35 U.S.C. 154(b) by 0 days.

(21) Appl. No.: 16/959,423

(22) PCT Filed: Dec. 26, 2018

(86) PCT No.: PCT/SG2018/000011
§ 371 (c)(1),
(2) Date: Jun. 30, 2020

(87) PCT Pub. No.: WO2019/135705
PCT Pub. Date: Jul. 11, 2019

(65) Prior Publication Data
US 2020/0360801 A1 Nov. 19, 2020

(30) Foreign Application Priority Data
Jan. 3, 2018 (IN) .............................. 201841000303

(51) Int. Cl.
*A63F 13/211* (2014.01)
*A63F 13/212* (2014.01)
(Continued)

(52) U.S. Cl.
CPC .......... *A63F 13/211* (2014.09); *A63F 13/212* (2014.09); *A63F 13/35* (2014.09); *A63F 13/65* (2014.09)

(58) Field of Classification Search
CPC ...... A63F 13/211; A63F 13/212; A63F 13/35; A63F 13/65
See application file for complete search history.

(56) References Cited

U.S. PATENT DOCUMENTS 9,712,629 B2* 7/2017 Molettiere ............ G06F 3/0486
10,391,361 B2* 8/2019 Watterson .......... A63B 71/0622
(Continued)

FOREIGN PATENT DOCUMENTS

| CN | 105688373 A | 6/2016 |
| CN | 106310643 A | 1/2017 |
| CN | 106880945 A | 6/2017 |

OTHER PUBLICATIONS

International Search Report for International Application No. PCT/SG2018/000011 dated Jul. 11, 2019.
(Continued)

*Primary Examiner* — Seng H Lim
(74) *Attorney, Agent, or Firm* — Thomas | Horstemeyer LLP (57) ABSTRACT

The invention discloses a system and method for tracking physical activities of a user in real world engaging in a virtual world. Based on at least one of a sensor data received from the user by means of a communication channel while performing a real-world activity, The system further generates a virtual journey schedule in the virtual world based on a user preference or a system preference and maps the real-world activity to the virtual journey by analyzing the received sensor data. The virtual journey schedule is generated based on the pace of the user.

14 Claims, 1 Drawing Sheet

(51) Int. Cl.
*A63F 13/35* (2014.01)
*A63F 13/65* (2014.01)

(56) References Cited

U.S. PATENT DOCUMENTS

| | | | | |
|---|---|---|---|---|
| 2010/0033303 A1* | 2/2010 | Dugan | .................. | A63F 13/212 |
| | | | | 340/5.82 |
| 2011/0098928 A1* | 4/2011 | Hoffman | ............ | A63B 71/0622 |
| | | | | 702/5 |
| 2013/0040714 A1* | 2/2013 | Rosing | .................... | A63F 13/69 |
| | | | | 463/7 |
| 2015/0080023 A1* | 3/2015 | Yang | ..................... | H04W 4/025 |
| | | | | 455/456.1 |
| 2015/0081059 A1* | 3/2015 | Hwang | .................. | G01S 19/19 |
| | | | | 700/91 |
| 2015/0081060 A1* | 3/2015 | Hwang | ................. | A61B 5/1118 |
| | | | | 700/91 |
| 2016/0030833 A1* | 2/2016 | Klassen | ................. | G16H 20/30 |
| | | | | 434/247 |
| 2016/0055420 A1* | 2/2016 | Karanam | ............... | A61B 5/165 |
| | | | | 700/52 |
| 2016/0157784 A1* | 6/2016 | Suzuki | ................. | A61B 5/7232 |
| | | | | 600/300 |
| 2016/0193499 A1* | 7/2016 | Kim | .................... | G09B 19/0038 |
| | | | | 434/247 |
| 2016/0250519 A1* | 9/2016 | Watterson | .......... | A63B 24/0075 |
| | | | | 482/4 |
| 2017/0147775 A1* | 5/2017 | Ohnemus | ............... | G16H 15/00 |
| 2017/0296872 A1 | 10/2017 | Yang et al. | | |
| 2017/0352179 A1* | 12/2017 | Hardee | ................. | A61B 5/6895 |
| 2019/0126099 A1* | 5/2019 | Hoang | ................. | A63F 13/798 |
| 2020/0357300 A1* | 11/2020 | Galasso | ............... | G09B 29/007 |

OTHER PUBLICATIONS

Written Opinion for International Application No. PCT/SG2018/000011 dated Jul. 11, 2019.
International Preliminary Report on Patentability Chapter I for International Application No. PCT/SG2018/000011 dated Jul. 7, 2020.

* cited by examiner

METHOD FOR TRACKING THE PHYSICAL ACTIVITIES OF A USER IN REAL WORLD TO INTERACT WITH A VIRTUAL ENVIRONMENT

FIELD OF THE INVENTION

The present invention relates to the field of wearable devices. In particular, the invention relates to a wearable device associated with a system to track the physical activities of a user in a real world to engage in a virtual world and a method thereof.

BACKGROUND OF THE INVENTION

Nowadays most of the people spend a lot of time in their virtual world. It is always good to have friends while performing physical activities including exercise or travelling to keep each of them motivated. However, owing to hectic lifestyles, in recent times, interactions and performing activities with friends in real world has decreased due to difficulty in taking time off from one's own busy schedule and secondly coordinating time off with the busy schedules of friends. As a result, people tend to engage and interact with friends in a virtual world, at their pace. There are many existing systems available in the field of tracking and gamification for tracking real world physical activities performed by a user. These gamification systems are in a more unvarying environment, which do not accommodate the dynamics of each individual user. Such systems are not capable to create a personalized environment to suit each individual user.

Hence, a need exist for a method and system which tracks the activities of a user to engage in a virtual world.

SUMMARY OF THE INVENTION

According to an embodiment, the present invention discloses a method for tracking a physical activity of a user in a real world engaging in a virtual world. The method includes the steps of receiving at least one of a sensor data associated with the user when performing a real-world activity by means of a communication channel, wherein the at least one sensor data is obtained from a sensor component; generating a virtual journey schedule in the virtual world based on the user preference or a system preference, wherein the virtual journey schedule depends on a pace of the user; and mapping the real-world activity of the user to the virtual journey by analyzing the at least one sensor data received.

According to another embodiment of the present invention, the method includes the step of analyzing the at least one sensor data received, to identify and determine an activity of the user, the pace of the user and an activity cycle of the user. In yet another embodiment of the present invention, the method also includes the step of creating a group of users in a network for the virtual journey schedule, wherein the group of users are selected from a contact list of the user, a set of users in the network for the virtual journey schedule or a combination thereof.

According to another embodiment of the present invention, the method includes the step of inviting at least one additional user in the network for the virtual journey and a virtual journey schedule based on the pace of the user or the activity cycle maintained by the user while performing the virtual journey. In yet another embodiment of the present invention, the virtual journey includes a virtual journey schedule, which comprises at least one of a starting location, an ending location, at least one intermediate destination. In another embodiment of the present invention, the virtual journey further includes a sub-journey, wherein the sub journey includes a sub-virtual journey schedule within each of the at least one intermediate destination.

According to another embodiment of the present invention, the method further includes the step of displaying at least one message about an upcoming event during the virtual journey. In yet another embodiment of the present invention, the method further includes the step of virtually meeting at least one additional user from the set of users in the network for the virtual journey schedule. Typically, the at least one additional user is proximately located in the virtual world or when user and the at least one additional user intersect at a common location or the at least one intermediate destination.

According to another embodiment of the present invention, the method further includes the step of monitoring the at least one sensor data, for a threshold value and to notify the user to alter the real-world activity when the value of the at least one sensor data is equal to or greater than the threshold value. In yet another embodiment of the present invention, the method further includes the step of adjusting the virtual journey schedule of the user with respect to the activity of the user, the pace of the user and the activity cycle of the user.

According to another embodiment of the present invention, the method also includes the step of creating a theme for a virtual world, wherein the theme includes a plan for performing a virtual journey in the virtual world. In yet another embodiment of the present invention, the method further includes the step of determining the pace of the user from one or more activities performed by the user in real world.

According to another embodiment of the present invention, the method includes the step of automatically determining a distance to be travelled by the at least one additional user in the network for the virtual journey schedule with respect to the virtual journey selected by the user, in the virtual world.

According to another embodiment of the present invention, the present invention discloses a system for tracking physical activity of a user in a real world engaging in a virtual world. The system includes at least one sensor configured to track the physical activity of the user when performing a real-world activity; a virtual journey configuring module to generate a virtual journey schedule in the virtual world based on an user preference, a system preference, or combinations thereof, wherein the virtual journey schedule depends on a pace of the user; and a sensor data mapping module configured to analyze a sensor data from the at least one sensor and map the real-world activity of the user to the virtual journey.

BRIEF DESCRIPTION OF THE DRAWINGS

The foregoing and other features of embodiments of the present invention will become more apparent from the following detailed description of embodiments when read in conjunction with the accompanying drawings. In the drawings, like reference numerals refer to like elements.

DETAILED DESCRIPTION

In the following detailed description, reference is made to the accompanying drawings that form a part hereof, and in which shown by way of illustration specific embodiments that may be practiced. These embodiments are described in sufficient detail to enable a person skilled in the art to practice the invention, and it is to be understood that other embodiments may be utilized and that logical, mechanical, and other changes may be made within the scope of the embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. The singular forms "a," "an," and "the" include plural references unless the context clearly dictates otherwise. The following detailed description is, therefore, not be taken as limiting the scope of the invention, but instead the invention is to be defined by the appended claims.

According to an embodiment, the present invention discloses a method for tracking a physical activity of a user in a real world engaging in a virtual world. The method includes the steps of receiving at least one of a sensor data associated with the user when performing a real-world activity by means of a communication channel, wherein the at least one sensor data is obtained from a sensor component; generating a virtual journey schedule in the virtual world based on the user preference or a system preference, wherein the virtual journey schedule depends on a pace of the user; and mapping the real-world activity of the user to the virtual journey by analyzing the at least one sensor data received.

Figure 1:
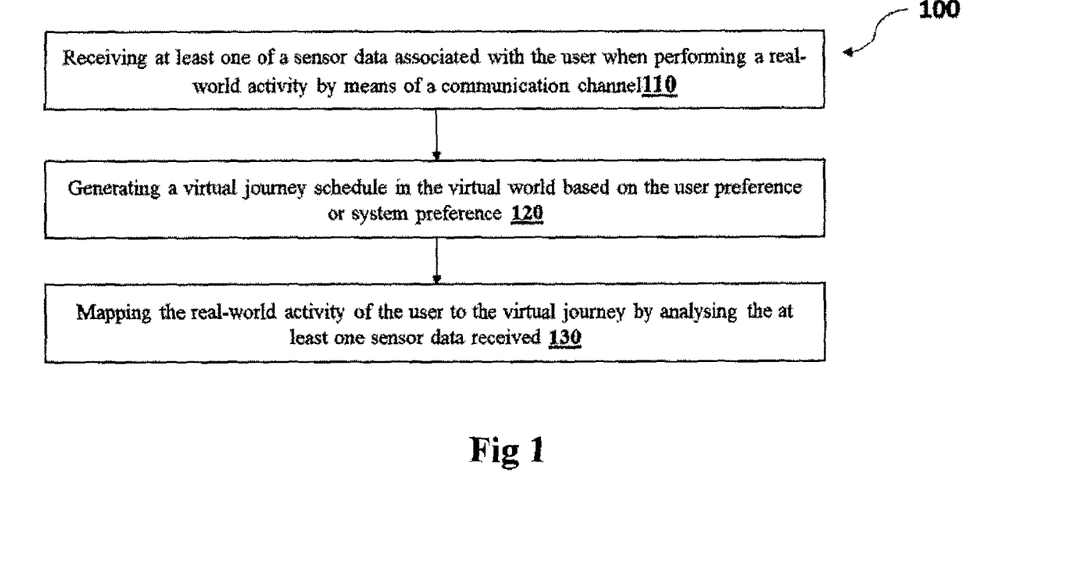
FIG. 1. illustrates the block diagram of the method for tracking the activities of a user in a real world to engage in a virtual world, in accordance with an embodiment of the invention.

FIG. 1. illustrates the block diagram of the method for tracking a physical activity of a user in a real world engaging in a virtual world, in accordance with an embodiment of the invention. The method (100) includes the step (110) of receiving at least one of a sensor data associated with the user when performing a real-world activity by means of a communication channel, wherein the at least one sensor data is obtained from a sensor component. The method (100) also includes the step (120) of generating a virtual journey schedule in the virtual world based on the user preference or a system preference, wherein the virtual journey schedule depends on a pace of the user. The method (100) further includes the step (130) of mapping the real-world activity of the user to the virtual journey by analyzing the at least one sensor data received. In one embodiment of the present invention, the virtual journey is generated based on a pace of the user. The pace is the rate of activity or movement, such as in running, walking, cycling, trekking, climbing or driving. Each person have different pace for different activity.

According to another embodiment of the present invention, the method includes the step of analyzing the at least one sensor data received to identify and determine an activity of the user, the pace of the user and an activity cycle of the user. Typically, the pace of the user is the rate of activity or movement, such as in running, walking, cycling, trekking, climbing or driving. For example, each person have different pace for different activity. Typically in an embodiment of the present invention, a virtual journey schedule for a virtual journey may be created by the user, or the system generates a virtual journey schedule for the user based on the identified pace of the user, the activity cycle of the user or a combination thereof, In yet another embodiment of the present invention, it is also possible to generate a virtual journey schedule using partially with the user inputs and the system inputs. Typically, the user creates the virtual journey schedule for the virtual journey in a wearable device or in a mobile device using the mobile application. In one scenario, the virtual journey is generated based on a pace of the user.

According to another embodiment of the present invention, the method identifies various activities of the user based on an analysis of the sensor data received from a wearable device, wherein the wearable device includes the sensor components. Thus, in an embodiment of the invention, the method automatically distinguishes activities of a user in a rest mode, and an activity mode from the sensor data received from the wearable device. In yet another embodiment of the present invention, the user may select a particular mode and perform the activity to identify and determine the pace or the activity for later purpose. The sensor data is processed by an application server and stored in a database. According to another embodiment of the present invention, the method may also enable the user to select an activity from an activity pool. The activity of the user includes but not limited to walking, jogging, running, swimming, cycling, trekking, climbing, driving etc. In an embodiment, the wearable device is connected to a mobile device and may receive inputs from the mobile device for example via a mobile application, configured in the mobile device. In yet another embodiment of the present invention, the user may create a virtual journey schedule for a virtual journey at any time in a mobile application and start travelling towards the destination or target virtually. In another embodiment of the present invention, the user can also create a group having additional users with similar pace and activity cycles, and start the virtual journey. In yet another embodiment of the present invention, the application tracks various physical movements such as cycling, swimming, jogging, trekking, climbing, driving etc. of the user without requiring any input from the user through at least one sensor configured in the wearable device. In one example embodiment of the present invention, the system allows the user to have a better and different experience, where he/she relates his/her day to day activities (walking, jogging, running, cycling, swimming, trekking, climbing, driving etc) to the act of reaching to a particular destination (for example, travelling to city or any other location) in the virtual world. In one embodiment of the present invention, the wearable device is capable of detecting, recording, monitoring and analyzing the one or more activities of the user, in the real world and appropriately sends the collected information to a mobile application configured in a mobile device. In another embodiment of the present invention, the mobile application uses one or more algorithms, with help of an application server and a database, and determines the information relating to the virtual journey.

According to another embodiment of the present invention, when the virtual journey schedule in the virtual world is generated based on the user preferences, the user is provided with the facility to select the starting location and the ending location (sometimes herein also referred to as "destination"), the time frame for performing the virtual journey, the type of activities the user wants to perform during the virtual journey, additional set of users who performs the virtual journey along with the user. In yet another embodiment of the present invention, the method also provides the facility to the user to define the various intermediate destinations and other criteria for evaluating the virtual journey.

According to another embodiment of the present invention, the method includes the step of creating a group of users in a network for the virtual journey schedule, wherein the group of users are selected from a contact list of the user, a set of users in the network for the virtual journey schedule or a combination thereof. In an embodiment of the present invention, the user is provided with a facility for selecting group members depending on his/her preferences.

According to another embodiment of the present invention, the method includes the step of inviting at least one additional user from a set of users in the network for the virtual journey schedule based on the pace of the user or the activity cycle maintained by the user while performing the virtual journey. In another embodiment, additional users may be added to the generated virtual journey at any time before the close of the virtual journey. In yet another embodiment of the present invention, additional users may be added to the generated virtual journey at a time specified by the user who initiates the virtual journey. In another embodiment of the present invention, the user and the additional users may be from the same or different geographical place, for example, the users and additional users may all be from Bangalore. Generally, the destination place may be any place (available in the map) in the virtual journey. For example, a person creates a virtual journey at Bangalore can also add a person originally from Bangalore, Chennai, Sydney, etc, in the real world. In another embodiment, the user creates a virtual journey and starts the virtual journey to a destination; he/she can also invite and add additional users to the virtual journey at any point during his journey. In one embodiment of the present invention, the user may include users who may already be a part of the network or an external user who may not be a part of the network. In yet another embodiment of the present invention, the user and the additional user who start the virtual journey from different places may meet in a commonplace or midway unless otherwise, if their path to the destination intersects and may travel to their common destination. In yet another embodiment of the present invention, in order to engage with the virtual world, the additional user who has received an invitation from the user, has to accept the virtual journey invitation to join the virtual journey. The acceptance of the invitation by the additional user is notified to the user who has initiated the invitation. Typically, the method analyses the sensor data to determine and calculate the distance to be travelled for the additional user, for the selected journey. In an example embodiment, the user or the additional user can choose any geographical place as a starting location and an ending location in the virtual world and initiate their journey.

According to another embodiment of the present invention, the virtual journey schedule comprises at least one of a starting location, an ending location (destination), and at least one intermediate destination (milestone). In yet another embodiment of the present invention, the system includes additional information regarding the type of activities to be followed for the virtual journey. Typically, the additional information includes at least one of a route for the virtual journey, a pace of the user, an activity cycle of the user, distance to be covered, milestones, distance between one or more milestones, real-time climatic conditions, an elevation data between the starting and ending location, and a time range for performing the virtual journey in the virtual world.

In an embodiment, the starting location and ending location relates to a first milestone and second milestone.

According to another embodiment of the present invention, the virtual journey further includes a sub-journey, wherein the sub-journey includes a sub-virtual journey within each of the at least one intermediate destination.

According to another embodiment of the present invention, the method includes the step of displaying at least one message about an upcoming event during the virtual journey. In yet another embodiment of the present invention, a message related to the upcoming event may be notified to any user of the users associated to the upcoming event. In an exemplary embodiment of the present invention, the upcoming event may be an achievement of the user.

In yet another embodiment of the present invention, the method further includes the step of virtually meeting at least one additional user from the set of users in the network for the virtual journey schedule. Typically, the at least one additional user is proximately located in the virtual world when user and the at least one additional user intersect at a common location or the at least one intermediate destination. Here, the proximity of the additional users is based on the virtual distance between the user and the at least one additional user. In yet another embodiment of the present invention, the proximate distance for the virtual meeting may be defined by the user at the beginning of the virtual journey or else the proximate distance may be set by the system.

According to another embodiment of the present invention, the method includes the step of monitoring the at least one sensor data for a threshold value and to notify the user to alter the physical activity, when a value of the at least one sensor data is equal to or greater than the threshold value. Typically, altering the physical activity further includes stopping the physical activity or performing the physical activity in an altered pace. In yet another embodiment of the present invention, the method further includes the step of adjusting the virtual journey schedule of the user with respect to the activity of the user, the pace of the user and the activity cycle of the user. According to another embodiment of the present invention, the method maintains a threshold for each activity or a set of activities in the activity cycle, performed by a user based on either of the following parameters such as for example, their age, medical history, real time health data, real time environment/climatic conditions etc. In another embodiment of the present invention, the method is also capable of automatically cancelling or stopping or alter the ongoing activity when the threshold of such activity is reached by the user. In one embodiment of the present invention, the threshold may be set by the user or system. Non-limiting examples of the threshold may include distance, time, etc. Typically, after cancelling or stopping the ongoing activity, the method further provides warning/notification to the user regarding the same. In one embodiment of the present invention, while altering the activity, the system verifies with the user, in such a way to continue with the altered activity.

According to another embodiment of the present invention, the method also includes the step of creating a theme for a virtual world, wherein the theme includes a plan for performing a virtual journey in the virtual world. Typically, the plan includes an activity, an activity cycle, number of steps to be covered in a day and pace to be maintained by the users to reach the ending location from the starting location, a map displaying starting and destination location, plurality of milestones, terrain/elevation information, climatic conditions, etc. In yet another embodiment of the present invention, the method further includes the step of determining the pace of the user from one or more activities performed by the user in real world. In yet another embodiment, the steps the users make in the virtual world are equivalent to the steps in real world.

According to another embodiment of the present invention, the method includes the step of automatically determining a distance to be travelled by the at least one additional user of the set of users in the network for the virtual journey schedule with respect to the virtual journey selected by the user, in the virtual world.

According to another embodiment of the present invention, for a group virtual journey, the activity of each user is being tracked, and mapped with their movement towards the virtual destination place. In one embodiment of the present invention, the completion date for example completion date to reach the destination location from the start location is (day wise) displayed to the users. For example, with the current pace, you will reach destination in 30 days. In another embodiment of the present invention, if the users maintain higher pace and contribution, a message or a motivational message is displayed. One such example is as follows, "You will reach your destination in just xx days and you are falling under those 2% percent of users, who is maintaining such pace to reach the subject destination location, Keep up the good work" (wherein "xx" would display the number of days). In yet another embodiment of the present invention, if the group member is lagging with respect to the chosen pace, a message with "you are lagging your pace, you will reach your destination in yy days" (wherein "yy" would indicate the number of days) may be displayed. In another embodiment of the present invention, the entire map may auto adapts to such pace. In another embodiment of the present invention, for a group virtual journey, if one of the member is not contributing to the virtual journey due to unexpected scenarios such as the member falls ill then the system may notify such condition to other members. In yet another embodiment of the present invention, the system may provide suggestion to drop such user from virtual journey. Further, the system reconfigures the virtual journey schedule along only with other members and total distance/pace/step etc. is recalculated after removing such user.

In an embodiment of the present invention, the method allows a user to initiate a group activity with plurality of additional users. According to another embodiment of the present invention, activities of each user in the group are independently recorded, maintained, and monitored. In yet another embodiment of the present invention, the method tracks when each user reaches their destination as well as intermediate destinations. In one embodiment of the present invention, when the user reaches an intermediate destination or a first or subsequent milestone in the journey, but the additional users are lagging behind, then the user or the additional users who reached the intermediate destination may perform a sub-journey. During the sub journey, the user may visit other nearby places in the intermediate destination and get back to the intermediate destination. In another embodiment of the present invention, the system calculates distance of the at least one additional user with respect to their current position and the intermediate destination and may suggest the user to visit the nearby places in the intermediate destination i.e. to start the sub virtual journey within a virtual journey. In one embodiment of the present invention, the user may be notified when the at least one additional user of the group reaches the first location. The user may anytime terminate such sub-virtual journey (journey within journey) and return to first location (for example, a meeting place or common place) in the intermediate destination. Typically, the user's activity details with respect to sub virtual journey are separately stored and maintained in a database. The method further allows the user to join the first location at any time and to start any other such journeys.

According to another embodiment, the present invention discloses a system for tracking a physical activity of a user in a real world engaging in a virtual world. The system includes at least one sensor component configured to track the physical activity of the user when performing a real-world activity; a virtual journey configuring module to generate a virtual journey schedule in the virtual world based on an user preference, a system preference, or combinations thereof, wherein the virtual journey schedule depends on a pace of the user; and a sensor data mapping module configured to analyze a sensor data from the at least one sensor and map the real-world activity of the user to the virtual journey.

Figure 2:
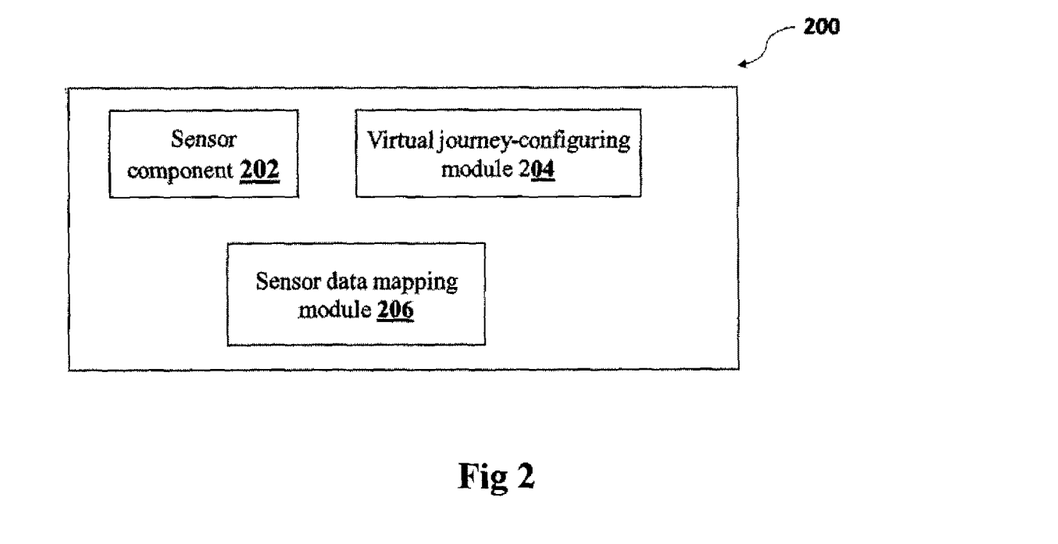
FIG. 2: illustrates an exemplary system diagram for tracking the activities of a user in a real world to engage in a virtual world, in accordance with an embodiment of the invention.

FIG. 2. Illustrates a block diagram of a system for tracking a physical activity of a user in a real world engaging in a virtual world, in accordance with an embodiment of the invention. The system (200) includes sensor component (202) configured to track the physical activity of the user while performing a real-world activity. The system (200) also includes a virtual journey-configuring module (204) to generate a virtual journey schedule in the virtual world based on either a user preference or a system preference, or combinations thereof, wherein the virtual journey schedule depends on a pace of the user. The system (200) also includes a sensor data mapping module (206) configured to analyze a sensor data from the at least one sensor component and map the real-world activity of the user to the virtual journey. In yet another embodiment of the present invention, the system (200) also includes a virtual journey invitation module (not shown) configured to enable a user to invite at least one additional user from a contact list of the user or from the users who are already into the virtual journey to join his/her virtual journey. The users who gets the invitation may enroll into the virtual journey even in the absence of a wearable device. It is possible for the user to join the journey based on the sensors or GPS present in their mobile phones and or in the mobile application.

According to another embodiment of the present invention, the system comprises of an application server, a database, a communication network and a wearable device configured and capable of tracking the physical activities of the user. The wearable device includes at least one sensor component to track the physical activity of the user. In one embodiment, the wearable device may be connected to a mobile device. The wearable device facilitates the monitoring, recording, and analyzing of the sensor data received from the sensor components. In an embodiment of the present invention, the sensor data is being monitored in the wearable device itself or partly in wearable device and partly in the mobile device connected to the wearable device i.e. the wearable device is capable of communicating and transmitting the user's physical activity to the mobile device. In an example embodiment of the present invention, the application server includes the virtual journey-configuring module (204), sensor data mapping module (206) and the virtual journey invitation module. In another example embodiment of the present invention, the application server includes many other modules for the seamless function of the method and system in accordance with the invention.

According to another embodiment of the present invention, a user creates a virtual journey schedule with a destination to travel (by any physical mode/activity including without limitation swimming, running, walking, jogging, cycling, trekking, swimming, climbing etc.). In one embodiment of present invention, the users in a virtual world may converge to a point or place; selection of routes may be done automatically or manually by the user. Typically, a virtual journey schedule includes the data not limited to active number of days, setting the goal for a period, pace at which the user can walk, number of steps to be covered in a day etc. In an embodiment of the present invention, the application server activates the virtual route for the virtual journey and may update the database accordingly. In an embodiment of the present invention, the application server may further record and monitor the virtual journey through the wearable device of the user (virtual journey creator) and the additional users (invited) in the group. In one embodiment of the present invention, the travel distance (source to destination) is automatically determined and updated in the database. The unit of distance travel is measured in steps and in any metric system. In another embodiment, the travel distance is manually updated or entered by the user.

According to another embodiment of the present invention, the application server may display the travel parameters such as total number of days to travel with the input pace, steps etc. The virtual journey is completed, when the users reaches the destination over a period of time i.e. when the cumulative steps of the virtual journey creator and the other users in a virtual journey is equal to the total travel distance (source to destination). It is possible to scale the pace to the distance in an appropriate way as defined during the generation/creation of the virtual journey by the user. The application server accumulates the direction/path of travel of the users. The application server also collects the information related to the place (intermediate destination reached by users) and displays such data. In one embodiment of the present invention, the virtual route may also be extended to the users who are driving daily (through motor cycle, car or any other transport and not included in a fitness use case).

According to another embodiment of the present invention, the following explains the virtual journey scheduled between geographically separated two places, for example, the virtual journey from Bangalore to Mumbai. The application server determines the total distance between Bangalore and Mumbai and converts them to steps (or feet), laps, kilometers, miles etc. In an embodiment of the present invention, the application server displays the data (total distance, distance travelled etc.) for the user requirement and selection. The important places between source and destination place are considered as intermediate destinations or milestones. For example, in the virtual journey from Bangalore to Mumbai places such as Tumkur, Chitradurga, Davanagere, Hubli, Belgaum, Kolhapur, Satara, and Pune may act as different intermediate destinations. These places are converted to intermediate destinations in the mobile application. In another embodiment of the present invention, the application server further collects the information (news, photos, historic importance, trivia if any) relating to these intermediate destinations and displays them to the user when they virtually reach these places. In yet another embodiment, the present invention allows the user to create morphed photos and share the same with his contacts. Typically, the user's photos is morphed with the photos of the intermediate destination or the destination accordingly. The destination has to be reached by the users through various modes of physical activities such as but not limited to walking, jogging, running, swimming, cycling etc. The user remains in his original location, but reaches such destinations virtually. All activities of the user are mapped to the virtual journey, which helps the user to reach their destination in the virtual world.

According to another embodiment of the present invention, it is possible to have virtual meeting with a friend in a user's contact list or a social network site, while the user is passing through the real time location of the additional user, while the user is undertaking the virtual journey. In another embodiment of the present invention, the real time creation of a possible converge place (virtual meet) where the user may virtually meet friends or other additional users, in the way points or at destination location or throughout the path. In yet another embodiment of the present invention, the user can also take photos, videos, with one or more friends share in the real-time social networks. The user can further continue with his/her virtual journey.

According to another embodiment of the present invention, the method suggests an activity cycle for the route selected by the user. An activity cycle may include but not limited to a good proportion of walking, jogging, running, cycling or swimming or combinations thereof. In yet another embodiment of the present invention, the selection of activity is provided by the user or automatically framed based on health data (for example, age, health data, heart rate data), activity history, dedicated time for activity per day or week, month etc.

According to another embodiment of the present invention, the virtual journey created may include activities such as but not limited to free fall, trekking, exercise mode and so on. In case of virtual fall, i.e. free fall from height includes the display of virtual fall from height and the system or method automatically captures the number of steps, laps, distance to be covered by user, based on the point in the sky. Accordingly, the user activity is suggested or set. In case of virtual trekking routes—the user can choose trekking as an activity. For example, trekking to Shivaganga betta (Shivaganga hill), In yet another embodiment of the present invention, the height and elevation of that hill is automatically calculated by the system. In yet another embodiment of the present invention, a theme is created and user is suggested a recommendation plan to achieve the top of the hill. The recommendation plan may include apart from others, details of total number of steps, total distance, breathing pattern etc. All real-time measurements of the hill is considered, where to be turned, which is most elevated place, a virtual rendered path is developed. The user is suggested with the recommendation plan to follow the same real-time effort to reach the top of the hill, which motivates and encourages the user. In another scenario, user may select the exercise mode not limited to treadmill or running but also other forms of exercises. The system stores a wide variety of exercise patterns. The exercise pattern is suggested to user based on their age, health, or any other medical data monitored by wearable device. The exercises are time bounded and asks the user to perform such exercise in real time. The exercise activity information (while performing the exercise, for example calories burnt), can be converted to steps or laps and used in virtual journey. The system and method are also capable to detect the elevation data (ups and downs, usually sea level) from source to destination and implement the same in the real-time activity of the user and accordingly mapped to the activities (for example walking, running).

According to another embodiment of the present invention, the virtual journey created may consider the real time climatic conditions of such places/locations in virtual world or the real-time conditions of the virtual journey. The climatic conditions include but not limited to tropical wet, tropical monsoon and tropical wet and dry. The system also considers the real-time temperature, pressure in the path (from source to destination). The system automatically maps (auto adapt) such climatic data and alters the required number steps/pace to reach the destination. For example, in extreme cold conditions, 300 steps in real time environment are considered as 100 steps in virtual journey, so as to feel the same effort carried by the user in such conditions. Auto conversion of data when climatic conditions are introduced. The user can also manual edit such climatic data, temperature and pressure, Thus it allows user to perform a virtual journey to anywhere in the world with a more realistic manner. It is also possible to create a virtual journey to any location in the world, planets, moon, and space station. The system shall convert the distance between starting location to ending location, to number of steps and appropriately prepares one or more themes for such virtual journeys.

According to another embodiment, the user can relate activity with that of but not limited to animals, birds or any moving organisms, transport vehicles, tall buildings, structures, highest & lowest points on earth, animal trials in forest, birds trial etc. According to another embodiment the present invention, the system provides different themes such as bird watching, animal watching, safari, race with cars, animals, walking on buildings, trees, etc. According to yet another embodiment the present invention, the system may also cover the related sounds in such conditions and the real sounds birds/animals can be used. According to yet another embodiment the present invention, the sound level is automatically increased/decreased when the user is nearing such animal/bird or going away from the animal/bird. In another embodiment of the present invention, an audio/video device or virtual reality device may be configured with wearable device and mobile device, for such purposes of visualizing the virtual journey. In yet another embodiment of the present invention, it is possible to perform auto adaptation of sound based on the theme selected by the user. To perform auto adaptation of sound the system maintains the database of birds, animals, their activity details, current location of animals etc. For example, bird trail in a bird sanctuary, the user or group of users will virtually walk through the bird trail. In yet another example embodiment of the present invention, the user can also spot and discover the bird/animal when he is nearing the bird/animal.

According to another embodiment of the present invention, the system also supports 2D or 3D display of such places with bird/animal and the user can spot or discover the bird/animals in accordance with bird watching or animal watching. In yet another embodiment of the present invention, the system may display information about the bird or animal or any upcoming such animal or bird. According to another embodiment of the present invention, the system also displays pop-up messages or quiz, for example, "In your path today, you will spot a bird, which is a rare species from Australia". According to yet another embodiment of the present invention, the system also supports, walking with pets. This is also applicable for group activities, the message is displayed to all users of virtual journey, with "Spot the tiger in your path" or any other such messages shall be shared.

According to an embodiment, the user has a wearable device with a plurality of sensors to capture various sensor data associated with the user's physical activities. The sensor data from the wearable device is monitored and stored to analyze the various patterns such as pace, user heart rate, physical stamina, food consumption, nutritional facts, location of the user and so on.

The foregoing description of the preferred embodiment of the present invention has been presented for the purpose of illustration and description. It is not intended to be exhaustive or to limit the invention to the precise form disclosed. Furthermore, all examples recited herein are principally intended expressly to be only for pedagogical purposes to aid the reader in understanding the principles of the present subject matter and are to be construed as being without limitation to such specifically recited examples and conditions. Many modifications and variations are possible in light of the above teachings.

We claim:

1. A method for tracking a physical activity of a user in a real world engaging in a virtual world, comprising:
receiving at least one sensor data associated with the user when performing a real-world activity through a communication channel, wherein the at least one sensor data is obtained from a sensor component of a wearable device;
receiving a specification of a plurality of user preferences associated with a virtual journey through an application of an electronic device in communication with the wearable device, the plurality of user preferences comprising a starting location, an ending location, a time frame for performing the virtual journey, at least one type of activity to perform during the virtual journey, and at least one intermediate destination in the virtual journey;
generating a virtual journey schedule for the virtual journey in the virtual world based on the plurality of user preferences, wherein the virtual journey schedule depends on a pace of the user determined from the at least one sensor data and comprises a distance to be covered, a plurality of milestones, a distance between the milestones, and a plurality of real-time climatic conditions;
mapping the real-world activity of the user to the virtual journey based on the at least one sensor data received;
generating a virtually meeting with the at least one additional user from the set of users in the network for the virtual journey schedule, wherein the at least one additional user is proximately located in the virtual world when the user and the at least one additional user intersect at a common location or the at least one intermediate destination;
creating a sub journey within said virtual journey when the user reaches an intermediate destination, and the at least one additional user are lagging behind to reach the intermediate destination;
computing a distance of the at least one additional user with respect to their current position and the intermediate destination, and suggesting the user to visit the nearby places in the intermediate destination to start the sub journey within the virtual journey based on said computing;
notifying said user if one of the at least one additional user is not contributing to the virtual journey due to unexpected scenarios including ill health;
suggesting said user to remove said at least one additional user who is not contributing from the virtual journey; and
configuring said virtual journey schedule along only with other members and recalculating at least one of distance, pace, steps after removing said at least one additional user who is not contributing.

2. The method as of claim 1, further comprising analyzing the at least one sensor data received to identify an activity, the pace, and an activity cycle of the user.

3. The method as of claim 2, further comprising adjusting the virtual journey schedule of the user with respect to the activity of the user, the pace of the user and the activity cycle of the user.

4. The method as of claim 1, further comprising creating a group of users in a network for the virtual journey schedule, wherein the group of users are selected from a contact list of the user, a set of users in the network for the virtual journey schedule or a combination thereof.

5. The method as of claim 1, further comprising inviting at least one additional user from a set of users in the network for the virtual journey schedule based on the pace of the user or the activity cycle of the user maintained by the user while performing the virtual journey.

6. The method as of claim 1, wherein the virtual journey schedule comprises at least one of a starting location, an ending location, and at least one intermediate destination.

7. The method as of claim 1, further comprising monitoring the at least one sensor data for a threshold value and notifying the user to alter the real-world activity when the value of the at least one sensor data is equal to or greater than the threshold value.

8. The method as of claim 1 further comprising creating a theme for a virtual world, wherein the theme includes a plan for performing a virtual journey in the virtual world.

9. The method according to claim 1, wherein the virtual journey schedule further comprises elevation data between the starting location and the ending location.

10. The method according to claim 1, wherein the proximity for the virtual meeting is defined by the user at a beginning of the virtual journey.

11. A system for tracking a physical activity of a user in a real world engaging in a virtual world, comprising:
at least one sensor configured to track the physical activity of the user when performing a real-world activity;
at least one server comprising memory, at least one hardware processor, and program instructions stored in the memory that, when executed by the at least one hardware processor, direct the at least one server to:
receive at least one sensor data associated with the user when performing a real-world activity through a communication channel, wherein the at least one sensor data is obtained from a sensor component of a wearable device;
receive a specification of a plurality of user preferences associated with a virtual journey through an application of an electronic device in communication with the wearable device, the plurality of user preferences comprising a starting location, an ending location, a time frame for performing the virtual journey, at least one type of activity to perform during the virtual journey, and at least one intermediate destination in the virtual journey;
generate a virtual journey schedule for the virtual journey in the virtual world based on the plurality of user preferences, wherein the virtual journey schedule depends on a pace of the user determined from the at least one sensor data and comprises a distance to be covered, a plurality of milestones, a distance between the milestones, and a plurality of real-time climatic conditions;
map the real-world activity of the user to the virtual journey based on the at least one sensor data received;
generate a virtually meeting with the at least one additional user from the set of users in the network for the virtual journey schedule, wherein the at least one additional user is proximately located in the virtual world when the user and the at least one additional user intersect at a common location or the at least one intermediate destination;
create a sub journey within said virtual journey when the user reaches an intermediate destination, and the at least one additional user are lagging behind to reach the intermediate destination;
compute a distance of the at least one additional user with respect to their current position and the intermediate destination, and suggesting the user to visit the nearby places in the intermediate destination to start the sub journey within the virtual journey based on said computing;
notify said user if one of the at least one additional user is not contributing to the virtual journey due to unexpected scenarios including ill health;
suggest said user to remove said at least one additional user who is not contributing from the virtual journey; and
configure said virtual journey schedule along only with other members and recalculating at least one of distance, pace, steps after removing said at least one additional user who is not contributing.

12. The system according to claim 11, wherein the virtual journey schedule further comprises elevation data between the starting location and the ending location.

13. The system according to claim 11, wherein the proximity for the virtual meeting is defined by the user at a beginning of the virtual journey.

14. A method for tracking a physical activity of a user in a real world engaging in a virtual world, comprising:
receiving at least one sensor data associated with the user when performing a real-world activity through a communication channel, wherein the at least one sensor data is obtained from a sensor component of a wearable device;
receiving a specification of a plurality of user preferences associated with a virtual journey through an application of an electronic device in communication with the wearable device, the plurality of user preferences comprising a starting location, an ending location, a time frame for performing the virtual journey, at least one type of activity to perform during the virtual journey, and at least one intermediate destination in the virtual journey;
generating a virtual journey schedule for the virtual journey in the virtual world based on the plurality of user preferences, wherein the virtual journey schedule depends on a pace of the user determined from the at least one sensor data and comprises the starting location, the ending location, a distance to be covered, a plurality of milestones, a distance between the milestones, a plurality of real-time climatic conditions, and elevation data between the starting location and the ending location;
mapping the real-world activity of the user to the virtual journey based on the at least one sensor data received; and
virtually meeting at least one additional user from a set of users in a network for the virtual journey schedule, wherein the at least one additional user is proximately located in the virtual world when the user and the at least one additional user intersect at a common location or the at least one intermediate destination, the proximity of the additional users is based on a virtual distance between the user and the at least one additional user, and the proximity for the virtual meeting is defined by the user at a beginning of the virtual journey;

create a sub journey within said virtual journey when the user reaches an intermediate destination, and the at least one additional user are lagging behind to reach the intermediate destination;

compute a distance of the at least one additional user with respect to their current position and the intermediate destination, and suggesting the user to visit the nearby places in the intermediate destination to start the sub journey within the virtual journey based on said computing;

notify said user if one of the at least one additional user is not contributing to the virtual journey due to unexpected scenarios including ill health;

suggest said user to remove said at least one additional user who is not contributing from the virtual journey; and configure said virtual journey schedule along only with other members and recalculating at least one of distance, pace, steps after removing said at least one additional user who is not contributing.

\* \* \* \* \*